US 7,871,693 B2

(12) United States Patent  
Laporte et al.

(10) Patent No.: US 7,871,693 B2
(45) Date of Patent: *Jan. 18, 2011

(54) DETECTABLE CABLE TIE

(75) Inventors: Richard Laporte, Collierville, TN (US); Robert DeWeez, Bartlett, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 936 days.

This patent is subject to a terminal disclaimer.

(21) Appl. No.: 11/638,241

(22) Filed: Dec. 13, 2006

(65) Prior Publication Data

US 2007/0234525 A1 Oct. 11, 2007

Related U.S. Application Data

(60) Provisional application No. 60/789,361, filed on Apr. 5, 2006.

(51) Int. Cl.
*B32B 7/02* (2006.01)

(52) U.S. Cl. ...................... 428/212; 428/220

(58) Field of Classification Search ................ 428/212, 428/220; 24/16, 25
See application file for complete search history.

(56) References Cited

U.S. PATENT DOCUMENTS

| 3,102,311 | A | 9/1963 | Martin et al. |
| 3,186,047 | A | 6/1965 | Schwester et al. |
| D205,940 | S | 10/1966 | Miller |
| 3,803,065 | A * | 4/1974 | Arai et al. .................... 523/205 |
| 4,152,475 | A | 5/1979 | Haley |
| 4,902,997 | A | 2/1990 | Moran |
| 5,047,100 | A | 9/1991 | Raymond et al. |
| 5,103,534 | A * | 4/1992 | Caveney .................... 24/16 PB |
| 5,198,137 | A | 3/1993 | Rutz et al. |
| 5,395,695 | A | 3/1995 | Shain et al. |
| 5,472,661 | A | 12/1995 | Gay |
| 5,621,949 | A | 4/1997 | Wells et al. |
| 5,629,092 | A | 5/1997 | Gay et al. |
| 5,630,252 | A | 5/1997 | Wells |
| 5,679,402 | A | 10/1997 | Lee |
| 5,690,522 | A | 11/1997 | Moreau |
| 6,076,235 | A | 6/2000 | Khokhar |
| 6,128,809 | A | 10/2000 | Khokhar |
| 6,185,791 | B1 | 2/2001 | Khokhar |
| 6,663,809 | B1 | 12/2003 | Haddock et al. |
| 6,816,794 | B2 | 11/2004 | Alvi |
| 7,017,237 | B2 | 3/2006 | Magno, Jr. et al. |
| 2005/0065239 | A1 * | 3/2005 | Cody et al. ................ 523/210 |

* cited by examiner

*Primary Examiner*—David R. Sample
*Assistant Examiner*—Lawrence D Ferguson
(74) *Attorney, Agent, or Firm*—Hoffmann & Baron, LLP

(57) ABSTRACT

A plastic cable tie and a method of making a plastic cable tie that can be detected by X-ray and metal detection devices as well as sonar, optical or visual detection devices. The cable ties are formed from a composition that includes metal particles; a compound; and a plastic material. The metal particles are preferably metal flakes and can be ferrous or non-ferrous materials. The compound can include iodine or barium, and is preferably barium sulfate. The plastic material can include a polypropylene, a polycarbonate, a polyethylene, a polyterephthalate (PET) or a polyamide.

27 Claims, No Drawings

DETECTABLE CABLE TIE

This application claims priority from provisional application Ser. No. 60/789,361, filed on Apr. 5, 2006, which is incorporated herein in its entirety. This application also incorporates in their entirety U.S. application Ser. No. 11/638,235, filed on Dec. 13, 2006 titled "Buoyant Detectable Cable Tie" and U.S. application Ser. No. 11/638,134, filed on Dec. 13, 2006 titled "Cable Ties Authentically Verifiable."

FIELD OF THE INVENTION

This invention pertains to cable ties and their accessories in general and, more particularly, to such devices that can be readily detected via sonar, X-ray, optically or visually or via metal detection devices.

BACKGROUND OF INVENTION

To insure the quality of products, numerous industries take significant steps to detect and remove impurities and foreign materials that may enter their product or process streams. This is especially the case in the manufacture of food products, medicine or other items that can affect the health of humans. Cable ties, like any other foreign material, are not intended to be part of a product or process stream and, therefore, it is desirable to remove them so that they do not contaminate the product and/or cause harm. However, when cable ties unintentionally enter a product or process stream, they can be very difficult to detect.

Cable ties and their accessories, such as mounting bases, have been in existence for several decades. They are quite useful in bundling wires or in tethering items to each other or to a support structure. Typically, cable ties are made of metal, plastic or a combination of the two (for example, a metal pawl in a plastic body).

The strength of a cable tie and/or its accessory is dependent on the material that is used, as well as the cross-sectional area of the tie. For most materials, a greater cross-sectional area results in a cable tie having greater strength. Accordingly, in order to maximize the strength of cable ties, great care is taken to eliminate any voids or air pockets which would decrease the cross-sectional area and weaken the ties. Therefore, one of the objectives is to maintain a certain minimum cross-sectional area along the length of cable ties and another objective is to insure that the cable ties remain intact and do not rupture or break.

Many different industries, such as the food, automotive, tobacco, pharmaceutical, rubber molding and nuclear industries, among others, employ detection equipment in order to remove any impurity or stray item that may find its way into product or process streams. Some of these systems employ X-ray equipment which identifies items having greater density. Other systems employ metal detectors that use magnetic properties to detect the foreign material. Sonar is also used to detect foreign matter as well as optics (photography) or other visual means. Obviously, the purpose of these detection systems is to scan the product or process stream to identify foreign material and remove it before harm is caused.

In the past, some cable ties have been made more detectable by the addition of small metal particles to the plastic resin prior to molding. Such metal particles are evenly distributed throughout the pre-molded material so that the metal particles are evenly distributed in the final molded product. This even distribution of the metal particles insures a fairly uniform product with only a minimal decrease in the strength of the cable tie. The ratio of plastic resin to metal particles is selected so that the cable tie can bend and flex without cracking. It is also desirable for all the metal particles to be covered by, or fully suspended within, the plastic resin so that they are not exposed to the environment. Exposure to the elements or to a corrosive environment can result in the metal particles deteriorating, which weakens cable ties and reduces their expected life. However, depending on the composition of the plastic material used to make the cable ties, it is not always possible to prevent the metal particles from being exposed on the surface of the cable ties.

The cable tie manufacturer referred to above has added metal particles to nylon cable ties so that they can be detected in the event that a tie breaks or a cut-off tail ends up where it is not wanted. The metal allows the tie or tail to be more easily detected, located and removed. These ties are sold by Hellermann-Tyton as Model No. MCT50L and described in the advertising literature as metal content ties, which can be detected by standard metal detecting equipment. Hellermann-Tyton discloses in its literature that the composition used to make the cable ties contains polyamide (nylon) 6,6 and 10% metal particles.

Increasing the amount of metal in the cable tie material increases the density of the cable tie, but it also compromises the strength of the cable tie because the additional metal replaces the nylon material in the cable tie from which the cable tie draws its strength. The strength of a cable tie is a function of its cross-sectional area and a reduction of the amount of nylon material in the cross-sectional area weakens the cable tie. Also, some of these metals may chemically react with the plastic cable tie material and cause the tie to prematurely fail. Further, such metals, if exposed to a harsh industrial environment, may quickly corrode and cause the cable tie to fail.

However, while the addition of metal particles to cable ties may suffice for some industries, it is not adequate for other industries. This is because the metal particles cannot be easily detected in the product streams of some industries. Therefore, the metal particles are oftentimes difficult to detect except by the most sensitive metal detection equipment. Also, some industries already employ X-ray equipment and so an objective of the invention is to make cable ties that are more easily detected by X-ray equipment.

Thus, it is an object of this invention to provide cable ties and accessories that are detectable without compromising their integrity or affecting their strength or operation. Yet another object of this invention is to provide a cable tie that is similar in shape to traditional cable ties so that they will be readily accepted by users. Another object of this invention is to provide a cable tie that is more easily detected than the metal cable ties that are now being sold and contains smaller amounts of metal particles. Yet another object of this invention is to add a compound that is detectable using other detection systems, such as X-ray, sonar, optics or photo/visual devices. These and other objects and advantages of the present invention will become obvious from the following disclosure.

SUMMARY OF THE INVENTION

In accordance with the present invention, a detectable cable tie is provided. The cable tie is formed from a composition that includes metal particles; a compound; and a plastic material. The cable tie can be detected by X-ray and metal detection devices as well as sonar, optical or visual detection devices. The metal particles are preferably metal flakes in a plastic carrier and can be ferrous or non-ferrous materials. The compound can include barium or iodine, and is preferably barium sulfate. The metal particles and the compound can make up from about 1% to about 20% by weight of the composition.

In a preferred embodiment, a detectable plastic article is formed from a composition that includes: a plastic material having a first melting point; metal particles in a plastic carrier material, wherein the plastic carrier material has a second melting point and wherein the first melting point is lower than or equal to the second melting point; and barium sulfate. The plastic article can be detected by X-ray and metal detection devices. The plastic material and the plastic carrier material can be any plastic material that can be used for forming plastic articles and includes polypropylenes, polycarbonates, polyterephthalate (PET) and polyamides.

The plastic material and the plastic carrier material can include a polypropylene, a polycarbonate, a polyethylene, a polyterephthalate (PET) or a polyamide. Particularly preferred plastic materials include nylons, most preferably nylon 6,6. The metal particles and the compound are preferably added to the plastic material before the plastic article or cable tie is formed. The metal particles make up at least 0.3% by weight of the composition, preferably 2% by weight and the compound makes up at least 0.5% by weight of the composition, preferably 3% by weight. In preferred embodiments, the metal particles and the barium sulfate comprise from about 1% to about 20% by weight of the composition. The most preferred compositions include ferrous flakes, barium sulfate and a propylene or a polyamide, most preferably a nylon.

Another embodiment of the present invention is a method of making a detectable cable tie which includes: combining a plastic material, metal particles and a compound to form a composition; heating the composition to a temperature sufficient to melt the plastic material; forming a portion of the heated composition into a cable tie; and cooling the cable tie. The cable ties that are formed can be detected by X-ray and metal detection devices. The compound makes up at least 0.5% by weight of the composition and is preferably barium sulfate. The metal particles comprise at least 0.3% by weight of the composition and can consist essentially of ferrous materials. The metal particles can be metal flakes and can be entrained in a plastic carrier. The plastic material can include a polypropylene, a polycarbonate, a polyterephthalate (PET) (also referred to herein as polyethylene terephthalate) or a polyamide. In preferred embodiments, the plastic material consists essentially of a polypropylene or a polyamide. The composition can be formed into a cable tie by a molding or an extrusion process.

Thus, it is the purpose of this invention to provide cable ties that are capable of being detected by multiple systems and using more than just one detection method. It is also the purpose of this invention to provide cable ties formed from materials that can be detected and which do not require the addition of a marker or an attached device to render them detectable. Accordingly, the properties of the materials from which the cable ties are formed and the concentrations of the different plastic cable tie materials are of paramount importance.

DETAILED DESCRIPTION OF THE INVENTION

The present invention relates to cable ties that can be easily found in the event that they unintentionally enter a product or a process stream. The cable ties are made from compositions that include plastic resins and detectable materials. These detectable materials are metal particles and compounds, which allow the cable ties to be easily detected using different types of detection equipment. Typically, the metal particles and compounds are mixed with the plastic resins to provide a composition which is then formed into a cable tie using processes well know to those of ordinary skill in the art.

Detection of failed cable ties or their severed components is an important issue in various industries and the present invention addresses this issue by providing a cable tie made from compositions with density and X-ray identifiable characteristics that make it easier to detect the cable tie. These characteristic are present in the cable tie materials and do not come from a device attached to the cable tie. This reduces the manufacturing costs and assembly time to a minimum. This also allows portions of a cable tie to be detected since all of the material in the cable tie is made from the detectable composition. Thus, even relatively small portions of the cable tie can be detected in a product stream.

As used in the disclosure of the present invention, metal detection means include devices that measure or sense magnetism, whereas, X-ray devices include those that detect irregularities in density in the product stream. The purpose of the present invention is to devise a cable tie composition that includes components that can be readily detected and located by either system.

As used in the present application, the term "cable tie" is intended to include cable ties as well as cable tie accessories, such as mounting bases, identification tags, markers, and other clamps, clips and retainers normally associated with cables or cable ties. Such cable ties and cable tie accessories are sold by Thomas & Betts Corporation under its TY-RAP® brand name. Moreover, the term "cable tie" as used herein is not limited to ties that are used with bundled wires and cables, but also refers to any type of plastic tie which includes a strap and a locking head on opposing ends or which has opposing ends that can be attached together to form a closed loop. Examples of such ties are found in U.S. Pat. No. 3,186,047 to Schwester et al.; U.S. Pat. Nos. 5,621,949 and 5,630,252 to Wells; U.S. Pat. Nos. 6,076,235; 6,128,809; and 6,185,791 to Khokhar; U.S. Pat. No. 7,017,237 to Magno, Jr. et al.; and U.S. Des. 205,940 to Miller. All of which are incorporated herein in their entirety. However, the examples in these patents are not intended to limit the construction of the term "cable tie" as used herein in any way.

The cable ties of the present invention are formed from plastic materials, as well as metal particles and one or more X-ray detectable compounds. The addition of metal particles and a compound to the plastic materials provides a cable tie that can be easily detected using either X-ray, metal detection devices, sonar, optics, visually or other like systems. Preferably, the metal particles and compounds are blended with the plastic material so that, when the cable ties are formed, the metal particles and compounds are fully disbursed or distributed throughout the cable tie. In preferred embodiments, the metal particles make up at least 0.3% by weight of the composition and as much as 25% by weight of the composition, and the one or more compounds make up at least 0.5% by weight of the composition and as much as 15% by weight of the composition. In more preferred embodiments, the metal particles make up from about 2% to about 15% by weight of the composition and the one or more compounds make up from 1% to about 10% by weight of the composition.

Ideally, the metal particles and the compound are combined with one or more plastic resins to form the composition prior to forming the cable tie. The composition is heated to a temperature high enough to allow the cable ties to be formed using extrusion or molding processes. Typically, the temperature corresponds to the melting temperature of the plastic resin or the blend of plastic resins that make up the composition. Those of ordinary skill in the art relating to extrusion or molding processes are familiar with the required processing temperatures of different plastic materials.

The plastic resins that can be used in the compositions of the present invention are polypropylene, polycarbonate, polyethylene terephthalate (PET), polyethylene, fluoropolymers and polyamide, preferably nylon and most preferably nylon 6,6, nylon 6,12 or nylon 11. Polypropylene and polyamide resins are preferred, polypropylenes because they can be easily mixed with metal particles and compounds and polyamides because they form particularly strong and durable cable ties.

Cable ties formed from plastic resins, whether they are of one-piece or two-piece construction, are generally identified or referred to in the industry as nylon or plastic cable ties (for any plastic material other than nylon). Depending on the plastic resin that is used, the density of the cable ties formed from the resins can vary widely and have different properties and performance characteristics. Consequently, cable ties, or portions of cable ties, that inadvertently enter a product stream can sink to different depths in the stream depending in part on the density of the cable tie materials and the density of the process stream material.

The metal particles can be ferrous, implying some iron therein, or non-ferrous, which would include such materials as stainless steel, aluminum or copper. Where magnetism is the method used to detect the foreign material, ferrous metals are preferred. Preferred metal particles are resistant to rusting or corrosion due to the environment in which the cable tie is used. Such corrosion is more likely to occur in extreme washdown areas. Therefore, the materials used in the cable ties and the method used to form the cable ties are selected to minimize or avoid deterioration due to such applications. The metal and plastic materials should be selected to provide maximum resistance to corrosion and/or deterioration due to vapors, fumes or exposure to certain chemical or other conditions found at a facility. Thus, the composition of the detectable cable ties is dictated by the specific applications to insure optimal performance.

The metal particles should be no more than about 25% by weight of the cable tie, more preferably less than about 15% by weight, to minimize the occurrence of cracking when the cable tie is wrapped around a bundle of wires. At the same time, a sufficient amount of the metal particles must be added to the plastic resin so that the cable ties can be easily detected. It has been found that the cable ties must contain at least 0.3% by weight metal particles in order to be easily detectable, preferably at least 2% by weight and most preferably at least 5% by weight. Thus, a cable tie containing metal particles dispersed in the cable tie material in a range of 0.3% to 25% by weight is contemplated by this invention, and preferably in the range of 2% to 15% by weight. Other ranges within these limits are also suitable. Coated and or encapsulated metal particles are well known in the art and are disclosed in U.S. Pat. No. 5,198,137 to Rutz et al., which discloses iron-based particles having a weight average particle size of about 10-200 microns; U.S. Pat. No. 5,395,695 to Shain et al., which discloses permanent magnet particles having sizes ranging from 100 to 300 microns; U.S. Pat. Nos. 5,472,661 and 5,629,092 to Gay, which disclose different metal particles having sizes ranging between 1 and 500 microns with preferred average sizes of 20-100 microns and 95-175 microns; and U.S. Pat. No. 5,679,402 to Lee, which discloses ferromagnetic particles having an average particle size between about 5 microns and about 500 microns. All of these references with respect to their teachings of plastic coated metal particles are incorporated herein in their entirety.

The compounds of the present invention are contrast agents, i.e. materials which strongly absorb X-ray radiation and, therefore, can be easily detected by X-rays. The contrasting compounds should be no more than about 15% by weight of the cable tie, more preferably less than about 10% by weight. X-rays are a form of electromagnetic radiation with a wavelength in the range of 10 to 0.01 nanometers, corresponding to frequencies in the range 30 to 30,000 PHz ($10^{15}$ hertz). X-rays are primarily used for diagnostic radiography and crystallography. However, it has been found that a small amount of particular compounds added to plastic cable tie material prior to molding acts as a contrast agent for X-ray detection. This allows cable ties formed in this manner to be easily detected using X-ray detection devices.

The contrasting compounds of the present invention are used as a marker in the plastic cable tie material so that the ties can be easily detected and located in a product or process stream. Every metal absorbs X-rays to some extent depending on the atomic number and the thickness. The contrasting compounds are selected for their ability to be easily detected by X-ray detection devices when present in small amounts. Thus, the ability to detect cable ties containing these contrasting compounds using X-ray equipment is greatly enhanced. It has been found that only a slight amount of a contrasting compound is required to increase the detectability of the cable tie using X-ray devices. Preferred contrasting compounds include iodine and barium compounds, which are easy to detect using X-ray equipment and are widely used in the medical field. The most preferred compound is barium sulfate, which typically is provided in the form of an insoluble white powder. The more barium sulfate in a composition, the more "dense" the X-ray effect, i.e. the greater the X-ray signature. It has been found that adding barium sulfate in an amount of at least 0.5% by weight of the cable tie material increases the detectability of the cable tie and, when barium sulfate is added in an amount of at least 3% by weight of the cable tie material, the cable ties can be easily detected.

The compound and the metal particles are combined with the plastic resin (or resins) prior to molding the cable tie to ensure even distribution of the component materials. The amount of compound and the amount of metal particles added to a plastic cable tie material can vary provided that the strength and flexibility of the cable tie is not compromised. Accordingly, the amounts of compound and the amount of metal particles added are particularly dependent upon the properties and processing characteristics of the specific plastic resins that are used.

The preferred method for forming the cable ties of the present invention includes combining metal particles, a compound and plastic material to form a composition. The composition is then heated to melt the plastic material. Because different plastic materials have different melt temperatures, the temperature to which the composition is heated will vary according to the plastic (or plastics) that are being used. The heated composition is then formed into cable ties using any of the well known methods for forming cable ties. In preferred embodiments, the formation of the cable ties includes either extrusion or molding steps. After the cable ties are formed, they are cooled, preferably to room temperature.

The metal particles are preferably metal flakes and most preferably metal flakes in a plastic carrier. The metal flakes are added to a plastic carrier so that they can be more easily processed with the plastic material in conventional plastic processing equipment, such as extruders and molding machines. Any plastic that is compatible with the plastic material used to form the cable ties can be used as the plastic carrier. The preferred plastic carriers are polyamides, polyethylenes and polypropylenes. In the most preferred embodiments, the melting temperature of the plastic carrier is greater than the melting temperature of the plastic material. When the cable ties are formed, the composition is heated to a temperature greater than the melting temperature of the plastic material, but lower than or equal to the melting temperature of the plastic carrier. In preferred embodiments, the melting temperature of the plastic material is lower than the melting temperature of the plastic carrier. This keeps the metal particles entrained in the plastic carrier and prevents them from falling to the bottom of the composition during processing.

While select preferred embodiments of this invention are illustrated, various modifications may occur to those skilled in the art. Therefore, it is to be understood that these modifications are incorporated within the embodiments of the present invention as if they were fully illustrated and described herein.

EXAMPLES

The examples set forth below serve to provide further appreciation of the invention but are not meant in any way to restrict the scope of the invention.

Example 1

In this example, a formulation was prepared that contained:
(1) 74% by weight polyamide 6,6;
(2) 13% by weight iron flakes in a plastic carrier;
(3) 5% by weight barium sulfate; and
(4) 8% concentrate blue colorant.

The components of the formulation were mixed together and then heated to a temperature of about 600° F. The heated mixture was then molded into cable ties and cooled to room temperature.

After the cable ties cooled, one of the ties was placed on a table and scanned with a metal detecting device manufactured by Thermo Electron Corporation, Waltham, Mass., which was set to detect metal particles at 0.170 cm/ferrous sphere. The metal detector indicated that the cable tie contained metal. This confirmed that the cable ties could be detected using a metal detecting device. The cable tie was then X-rayed with an X-ray device manufactured by Smith-Heimann, Eagle FA detector. The X-ray showed that the cable tie provided a clear X-ray image.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:

1. A cable tie formed from a composition consisting of:
   metal particles, wherein the metal particles have an average particle size of between about 20 microns and about 100 microns;
   a compound comprising barium; and
   a plastic material,
   wherein the cable tie can be detected by X-ray and metal detection devices.

2. The cable tie as set forth in claim 1, wherein the compound is barium sulfate.

3. The cable tie as set forth in claim 1, wherein the metal particles and the compound comprise from about 1% to about 20% by weight of the composition.

4. The cable tie as set forth in claim 1, wherein the plastic material comprises a polypropylene, a polycarbonate, a polyethylene, a polyterephthalate (PET) or a polyamide.

5. The cable tie as set forth in claim 1, wherein the metal particles comprise a ferrous material.

6. The cable tie as set forth in claim 1, wherein the metal particles comprise a non-ferrous material.

7. The cable tie as set forth in claim 1, wherein the metal particles and the compound are added to the plastic material before the cable tie is formed.

8. The cable tie as set forth in claim 1, wherein the cable tie can be detected by sonar, optical or visual detection devices.

9. The cable tie as set forth in claim 1, wherein the metal particles comprise at least 0.3% by weight of the composition and the compound comprises at least 0.5% by weight of the composition.

10. The cable tie as set forth in claim 1, wherein the metal particles comprise metal flakes in a plastic carrier.

11. A cable tie formed from a composition consisting of:
    metal particles in a plastic carrier, wherein the metal particles have an average particle size of between about 20 microns and about 100 microns;
    barium sulfate; and
    a polypropylene, a polycarbonate, a polyterephthalate (PET) or a polyamide,
    wherein the cable tie can be detected by X-ray and metal detection devices.

12. The cable tie as set forth in claim 11, wherein the metal particles and the barium sulfate comprise from about 1% to about 20% by weight of the composition.

13. The cable tie as set forth in claim 11, wherein the metal particles comprise a ferrous material.

14. The cable tie as set forth in claim 11, wherein the metal particles comprise metal flakes.

15. The cable tie as set forth in claim 11, wherein the metal particles comprise ferrous flakes and the polyamide is a nylon.

16. The cable tie as set forth in claim 11, wherein the metal particles comprise at least 0.3% by weight of the composition and the barium sulfate comprises at least 0.5% by weight of the composition.

17. The cable tie as set forth in claim 11, wherein the metal particles have a weight average particle size of between about 20 microns and about 500 microns.

18. A cable tie formed from a composition consisting of:
    metal particles, wherein the metal particles have an average particle size of at least 20 microns;
    a compound consisting of barium; and
    a plastic material consisting of a polypropylene, a polycarbonate, a polyethylene, a polyterephthalate (PET) or a polyamide,
    wherein the cable tie can be detected by X-ray and metal detection devices.

19. The cable tie as set forth in claim 18, wherein the plastic material is polypropylene and the compound is barium sulfate.

20. The cable tie as set forth in claim 18, wherein the metal particles and the compound comprise from about 1% to about 20% by weight of the composition.

21. The cable tie as set forth in claim 18, wherein the metal particles comprise a ferrous material.

22. The cable tie as set forth in claim 18, wherein the metal particles and the compound are added to the plastic material before the cable tie is formed.

23. The cable tie as set forth in claim 18, wherein the cable tie can be detected by sonar, optical or visual detection devices.

24. The cable tie as set forth in claim 18, wherein the metal particles comprise at least 0.3% by weight of the composition and the compound comprises at least 0.5% by weight of the composition.

25. The cable tie as set forth in claim 18, wherein the metal particles comprise metal flakes in a plastic carrier.

26. The cable tie as set forth in claim 18, wherein the metal particles have an average particle size of up to about 500 microns.

27. The cable tie as set forth in claim 18, wherein the metal particles have an average particle size of between about 20 microns and about 100 microns.

* * * * *